(12) United States Patent
Montes

(10) Patent No.: US 7,454,198 B2
(45) Date of Patent: *Nov. 18, 2008

(54) RADIOCOMMUNICATION MODULE HOSTING AND EXECUTING A CLIENT SOFTWARE, AND CORRESPONDING METHOD FOR IMPLEMENTING A DRIVING CLIENT SOFTWARE

(75) Inventor: Jacques Montes, Nogent sur Marne (FR)

(73) Assignee: Wavecom, Issy-Les-Moulineaux (FR)

( * ) Notice: Subject to any disclaimer, the term of this patent is extended or adjusted under 35 U.S.C. 154(b) by 417 days.

This patent is subject to a terminal disclaimer.

(21) Appl. No.: 10/472,591

(22) PCT Filed: Mar. 22, 2002

(86) PCT No.: PCT/FR02/01024

§ 371 (c)(1),
(2), (4) Date: Mar. 26, 2004

(87) PCT Pub. No.: WO02/078375

PCT Pub. Date: Oct. 3, 2002

(65) Prior Publication Data

US 2004/0152456 A1 Aug. 5, 2004

(30) Foreign Application Priority Data

Mar. 22, 2001 (FR) .................................. 01 03909

(51) Int. Cl.
*H04M 3/00* (2006.01)

(52) U.S. Cl. .................. 455/418; 455/419; 455/420; 455/550.1; 719/321; 719/327

(58) Field of Classification Search ......... 455/418–420, 455/550.1, 556.1, 558, 410–411, 552.1, 426.1; 709/203, 208, 250; 717/127, 168–178; 719/321, 719/327; 710/68
See application file for complete search history.

(56) References Cited

U.S. PATENT DOCUMENTS 5,613,123 A * 3/1997 Tsang et al. ................... 713/1

(Continued)

FOREIGN PATENT DOCUMENTS

FR 2 775 550 A1 2/1999

(Continued)

*Primary Examiner*—Sharad Rampuria
(74) *Attorney, Agent, or Firm*—Shewchuk IP Services, LLC; Jeffrey D. Shewchuk

(57) ABSTRACT

The invention concerns a radiocommunication module, of the type hosting and executing a main software providing in particular radiocommunication functions. The main software comprises means for executing drive controls, sent to the main software and belonging to a predetermined set of drive controls. The invention is characterised in that the radiocommunication module further hosts and executes at least a client software, called onboard client software. The onboard client software and the main software comprise means enabling the onboard client software acts at least as one of the following: a driver client software, sending drive controls to the main software, and receiving from the main software responses, resulting from the execution of some of the drive controls; a supervising client software, managing the execution if the drive controls sent by a driver client software, called external client software, hosted and executed by a third party equipment co-operating with the radiocommunication module.

18 Claims, 7 Drawing Sheets

U.S. PATENT DOCUMENTS

| | | | |
|---|---|---|---|
| 5,815,682 A * | 9/1998 | Williams et al. | 703/25 |
| 5,819,115 A * | 10/1998 | Hoese et al. | 710/68 |
| 5,951,684 A * | 9/1999 | Jeon | 713/1 |
| 6,330,586 B1 * | 12/2001 | Yates et al. | 709/201 |
| 6,418,310 B1 * | 7/2002 | Dent | 455/418 |
| 6,498,788 B1 * | 12/2002 | Emilsson et al. | 370/342 |
| 6,502,124 B1 * | 12/2002 | Shimakawa et al. | 709/203 |
| 6,594,708 B1 * | 7/2003 | Slaughter et al. | 719/315 |
| 6,650,892 B1 | 11/2003 | Thiriet | 455/419 |
| 6,658,500 B1 * | 12/2003 | Pinault | 710/11 |
| 6,671,522 B1 * | 12/2003 | Beaudou | 455/558 |
| 6,832,373 B2 * | 12/2004 | O'Neill | 717/171 |
| 7,197,551 B2 * | 3/2007 | Ketola et al. | 709/223 |
| 7,237,198 B1 * | 6/2007 | Chaney | 715/730 |
| 2001/0029178 A1 * | 10/2001 | Criss et al. | 455/419 |
| 2001/0056502 A1 * | 12/2001 | Hollstrom et al. | 709/250 |
| 2002/0169591 A1 * | 11/2002 | Ryzl | 703/24 |
| 2003/0172172 A1 * | 9/2003 | de Bonet et al. | 709/230 |
| 2004/0152456 A1 * | 8/2004 | Montes | 455/418 |
| 2004/0162103 A1 * | 8/2004 | Montes | 455/550.1 |

FOREIGN PATENT DOCUMENTS

| | | |
|---|---|---|
| FR | 2 775 550 | 9/1999 |
| WO | WO 99 63767 | 12/1999 |
| WO | WO 9963767 A2 * | 12/1999 |
| WO | WO 00 33538 | 6/2000 |

* cited by examiner

RADIOCOMMUNICATION MODULE HOSTING AND EXECUTING A CLIENT SOFTWARE, AND CORRESPONDING METHOD FOR IMPLEMENTING A DRIVING CLIENT SOFTWARE

CROSS-REFERENCE TO RELATED APPLICATION

This Application is a Section 371 National Stage Application of International Application No. PCT/FR02/01024, filed Mar. 22, 2002 and published as WO 02/078375 on Oct. 3, 2002, not in English.

FIELD OF INVENTION

The domain of this invention is radiocommunication systems, and particularly but not exclusively the GSM (Global System for Mobile Communications) standard, DCS 1800 (Digital Cellular System 1800 MHz), PCS 1900 (Personal Communication system), GPRS (General Packet Radio Service) or UMTS (Universal Mobile Telecommunication System).

BACKGROUND OF THE INVENTION

More precisely, the invention relates to a radiocommunication module. Remember that the radiocommunication module is an essential element of a radiotelephone. It hosts and executes a main software (commonly called "radiocommunication software" or "GSM software") that in particular performs wireless communication functions (radiocommunication) and controls various other hardware elements (screen, keyboard, loudspeaker, etc.) of the radiotelephone.

Normally (first application), the radiocommunication module is included in a terminal (or ME for "Mobile Equipment") that cooperates with a SIM (Subscriber Identity Module) card.

Other applications are now envisaged for the above mentioned radiocommunication module.

In particular, it has been proposed to integrate the radiocommunication module in devices other than radiocommunication terminals but that still require a wireless communication function (second application). For example, telemetry devices (for reading meters), alarm devices or bank card readers.

It has also been proposed to supply the radiocommunication module in independent form (third application); it is then qualified as a modem. This type of modem does not contain any hardware man-machine interface element (screen, keyboard, loudspeaker, etc.). It is designed to cooperate with a terminal equipment (supporting a client software), that does have hardware man-machine interface elements. In particular, but not exclusively, the terminal equipment may be a microcomputer. In general, the terminal equipment hosts and executes a client driver software that controls the radiocommunication module, using a set of driver commands in the AT format. The AT (for ATtention command) commands enable the Terminal Equipment (TE) to request the radiocommunication terminal to which it is connected to perform some predetermined actions. To achieve this, the main software (hosted on the radiocommunication module) comprises means of executing AT commands sent to it by the client driver software (hosted on the terminal equipment).

For further information about AT commands, refer firstly to the ETSI "GSM 07.05" and "GSM 07.07" standards, and secondly to the ITU-T recommendation V25ter which are inserted herein by reference.

In general, a radiocommunication module can be driven by a terminal equipment using AT commands not only within the framework of the above mentioned third application (radiocommunication module forming a modem), but also within the context of the first and second applications mentioned above (radiocommunication module included in a radiocommunication terminal or other system).

In other words, regardless of what application is envisaged, the radiocommunication module may be driven by a terminal equipment with which it cooperates (usually through a serial link). In this case, a client driver software (comprising a "client external application"), hosted and executed by the terminal equipment, sends AT commands to a main software, hosted and executed by the radiocommunication module, so that the radiocommunication module can execute them.

As shown in FIG. 2, operation of the existing technique used for terminal equipment to drive a radiocommunication module may be summarized as follows:

step "1": the client external application (client driver software) 2 sends an AT command;
step "2": the serial link 5 transmits the AT command to the AT command execution means 4 included in the main software 3 hosted and executed by the radiocommunication module 1;
step "3.": the execution means 4 execute the AT command;
step "4": after execution, the execution means 4 send an AT response to the client external application 2;
step "5": this response is sent through the serial link 5;
step "6": the client external application 2 receives the response.

Each of these steps is shown in FIG. 2 by a circle in which the number of the step concerned is entered. The same convention is adopted in the following figures related to this invention (and that are described in detail in the remainder of the description).

The existing technique for driving a radiocommunication module by terminal equipment has several disadvantages.

Firstly, it requires two sets of resources (processor and memory). The radiocommunication module comprises a processor and a memory (first set of resources) and the terminal equipment also has a processor and a memory (second set of resources). Therefore, the existing technique mentioned above is expensive in terms of equipment and energy consumption.

Another disadvantage of the above mentioned existing technique is that the radiocommunication module is entirely driven by the terminal equipment. The client driver software hosted on and executed by the terminal equipment is the "master", while the main software hosted and executed by the radiocommunication module, is the "slave".

The purpose of the invention is particularly to overcome these disadvantages with the state of the art.

More specifically, one purpose of this invention is to provide a technique for driving a radiocommunication type module using a client driver software, that is simple and inexpensive (in terms of hardware and energy consumption).

Another purpose of the invention is to provide such a driver technique enabling the radiocommunication module to supervise (and act upon) the driving procedure, when driving is carried out by a terminal equipment. In other words, it is desired that the radiocommunication module does not only act as a slave.

SUMMARY OF THE INVENTION

These various objectives and others which will appear later are achieved using a radiocommunication module, of the type hosting and executing a main software performing radiocommunication functions, the said main software comprising means of executing driver commands, sent to the main software by at least a client driver software, and belonging to a predetermined set of driver commands. According to the invention, the radiocommunication module also hosts and executes at least one client software, called the client embedded software. Furthermore, the client embedded software and the main software comprise means of enabling the client embedded software to perform at least one of the following two roles:

the role of a client driver software sending driver commands to the main software, and receiving responses from the main software resulting from the execution of some of the driver commands;

the role of a client supervision software, managing execution of driver commands sent by a client driver software, called the client external software, hosted and executed by terminal equipment cooperating with the radiocommunication module. Therefore, the general main principle of the invention consists of hosting at least one client software on the radiocommunication module, that can act as a client driver software and/or as a client supervision software.

Thus, if the client embedded software acts as a client driver software, the radiocommunication module will operate independently and inexpensively. In this case, the radiocommunication module does not need to cooperate with any terminal equipment, and the main software and the client driver software use the same resources (same processor and same memory).

This invention also provides a means of not limiting the radiocommunication module to acting as a slave towards the terminal equipment that executes the client driver software, in the case in which the client embedded software acts as client supervision software. The client supervision software executed by the radiocommunication module manages driver actions requested by the client driver software executed by the terminal equipment. Note that in this case, the client embedded software is additional to the state of the art configuration mentioned above. However, this additional software is inexpensive since it uses the same resources (processor and memory) as a main software also hosted on the radiocommunication module.

Advantageously, the following features are provided to enable the client embedded software to act as client supervision software:

the main software comprises means of preparsing commands as a function of a determined preparsing policy, so as to transmit driver commands from the client external software to the client embedded software and/or to execution means contained in the main software;

the client embedded software includes means of processing driver commands switched to it by the said preparsing means.

In this way, the client embedded software can:

either do nothing, the commands being sent only to the main software, which executes them directly;

or filter commands transmitted to it without being executed by the main software. For example, the client embedded software may thus decide which commands should be executed by the main software and the commands for which a response should be made without execution, as a function of determined criteria;

or "spy" on commands of which it receives a copy, and which are also executed directly by the main software.

Advantageously, to enable the client embedded software to act as client supervision software:

the main software comprises means of preparsing responses as a function of a determined response preparsing policy, so as to transmit responses resulting from the execution of some driver commands by execution means included in the main software, to the client embedded software and/or to the client external software;

the client embedded software comprises means of processing responses switched to it by the said response preparsing means.

In this way, the client embedded software can:

either not take any action, responses generated by the main software being transmitted only to the client external software;

or filter responses transmitted to it without being transmitted to the client external software. For example, the client embedded software can thus decide what responses should be sent to the client external software (modified or not modified) as a function of defined criteria, and what responses should not be transmitted to this client external software;

or "spy" on responses of which it receives a copy and which are also sent directly to the client external software.

Preferably, the said main software comprises one main application particularly based on a set of execution functions, each enabling the execution of at least one of the said driver commands. The client embedded software includes a client application, particularly based on a set of source functions, each enabling sending or receiving driver commands or responses to driver commands, to or from the main application. The main software and/or the said client embedded software comprise an application interface used to interface the said source functions with the said execution functions.

The result is to limit development costs, due to the fact that the interface application (also called the application interface library in the following) can be used with different client applications, or even with different main software, once it has been developed.

In one preferred embodiment of the invention, the said set of driver commands is a set of standard AT commands.

This enables fast development of the client embedded software, since AT commands are well known and are already used for the development of client external software (hosted on the terminal equipment). This also facilitates development of a client software strongly based on an existing client external software.

The invention also relates to a process for implementation of a client software for the control of a radio communication module, the said radiocommunication module being of the type that hosts and executes a main software particularly performing radiocommunication functions, the said main software comprising means of executing driver commands sent to the main software by the said client driver software and belonging to a predetermined set of driver commands. According to the invention, the said radiocommunication module hosts and also executes at least one client software, called the client embedded software. The client embedded software and the main software dialogue with each other such that the client embedded software performs at least one of the following two roles:

the role of the said client driver software to send driver commands to the main software, and to receive responses resulting from execution of some of the driver commands from the main software;

the role of a client supervision software, managing execution of driver commands sent by the said client driver software, the said client driver software called the client external software being hosted on and executed by terminal equipment cooperating with the radiocommunication module.

BRIEF DESCRIPTION OF THE DRAWINGS

Other characteristics and advantages of the invention will become clear after reading the following description of a preferred embodiment of the invention given as a non-limitative example, and the attached drawings, in which:

FIG. 4 shows a command preparsing mechanism enabling the client embedded software to filter commands originating from the client external software;

FIG. 5 shows a variant embodiment of the command preparsing mechanism in FIG. 4, enabling the client embedded software to spy on commands originating from the client external software;

FIG. 6 shows the response preparsing mechanism, enabling the client embedded software to filter responses intended for the client external software;

FIG. 7 shows a variant of the response preparsing mechanism in FIG. 6, enabling the client embedded software to spy on responses intended for the client external software.

DETAILED DESCRIPTION OF THE PREFERRED EMBODIMENTS

Therefore, the invention relates to a radiocommunication module hosting and executing a main software and at least one client embedded software, using the same set of resources (processor and memory).

Conventionally, in particular the main software (for example a "GSM software") performs radiocommunication functions and comprises means of executing driver commands (sent to it by a client driver software).

The client embedded software (concept specific to this invention), can act as:
  a client driver software (first embodiment of the invention, described below with reference to FIG. 3), and/or
  a client supervision software (second embodiment of the invention, described below in relation to FIGS. 4 to 7).

In the remainder of this description, it is assumed that the driver commands are AT commands. However, it is clear that this invention is not restricted to this type of driver command.

Figure 1:
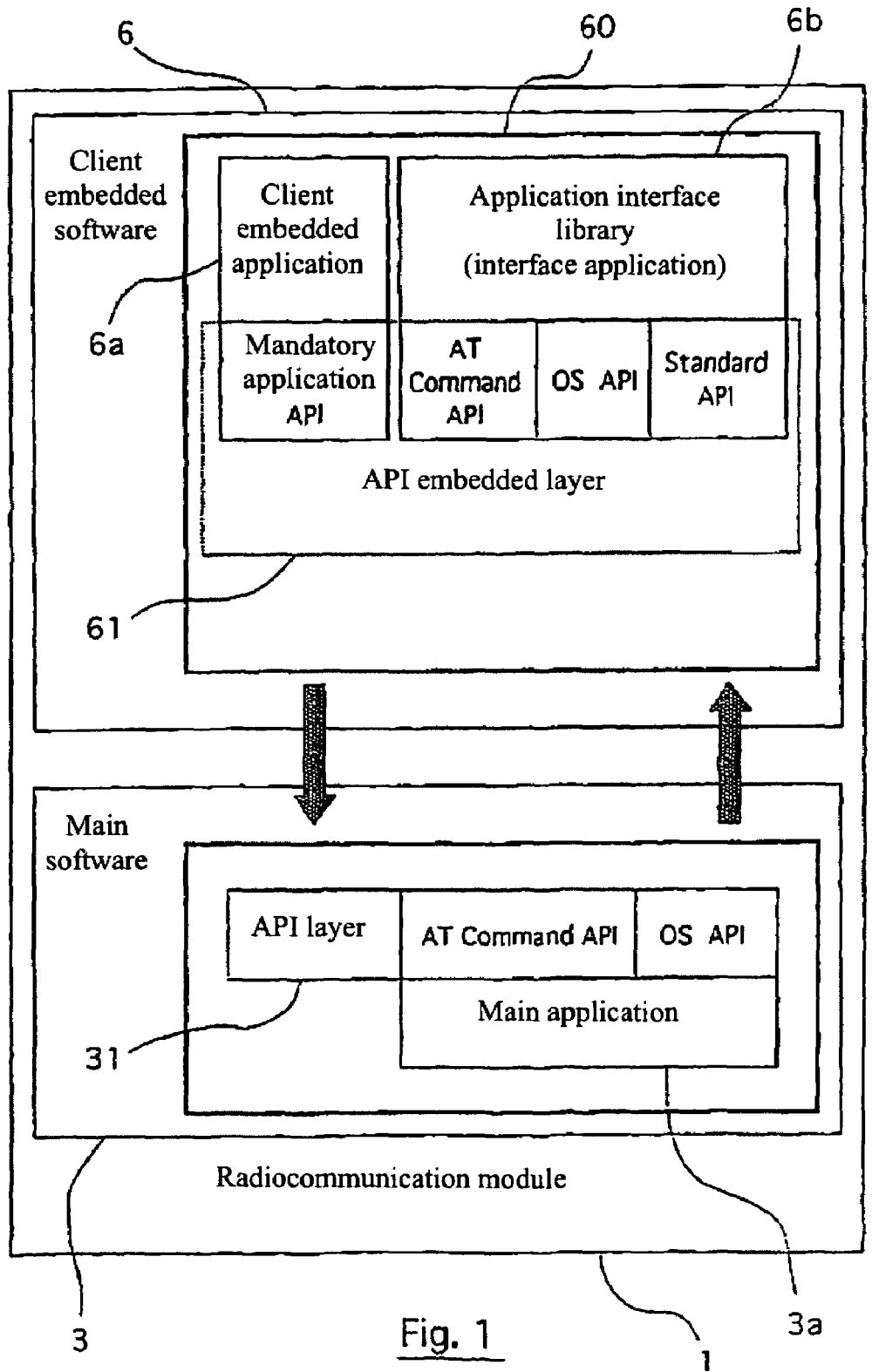
FIG. 1 shows a simplified diagram of a particular embodiment of a radiocommunication module according to this invention.

In the particular embodiment shown in FIG. 1, the main software 3 comprises a main application 3a based particularly on a set of execution functions, each enabling the execution of at least one AT command.

Furthermore, the client embedded software 6 comprises:
  a client application 6a, particularly based on a set of source functions, each enabling sending AT commands to a main application 1a, or receiving AT commands from this application;
  an interface application 6b, enabling interfacing of source functions (of the client main application 6a) with execution functions (of the main application 3a).

The client embedded software 6 and the client main software 3 communicate with each other by using API layers, references 61 and 31 respectively. Note that the term API (Application Programming Interface) denotes an interface. It is a description of communication rules corresponding to a particular functional assembly.

In the client embedded software 6, the API layer (embedded) 61 comprises:
  in the client embedded application 6a:
    an "Application Mandatory API" block forming an interface describing functions that are to be defined in the client embedded application;
  in the interface application (or the interface application library) 6b: the following three blocks:
    an "AT command API" block forming an interface describing access to AT commands, this interface describes functions located in the application interface library;
    an "OS API" block forming an interface describing access to operating system functions, this interface describes functions located in the application interface library;
    a "Standard API" block forming an interface describing the access to standard functions, this interface describes functions located in the application interface library.

In the main application 3a in the main software 3, the API layer (exported) comprises:
  an "AT command API" block, similar to the block with the same name in the API layer 61 (embedded) in the client embedded software 6;
  an "OS API" block, similar to the block with the same name in the API layer 61 (embedded) in the client embedded software 6.

The main application 3a forms the kernel of the main software 3, and the client application 6a, and the interface application 6b form the kernel 60 of the client embedded software 6.

The interface application 6b is a software entity that enables a dialogue between two independent software entities (or binary entities namely the client application 6a and the main application 3a. For example, they are in the form of a library (already compiled).

The client embedded software and the main software each use a distinct part of the same RAM. The client defines the size of the memory stack necessary for correct execution of the client embedded software. An attempt by one of the two software programs to access part of the RAM reserved for the other software will stop operation.

Figure 3:
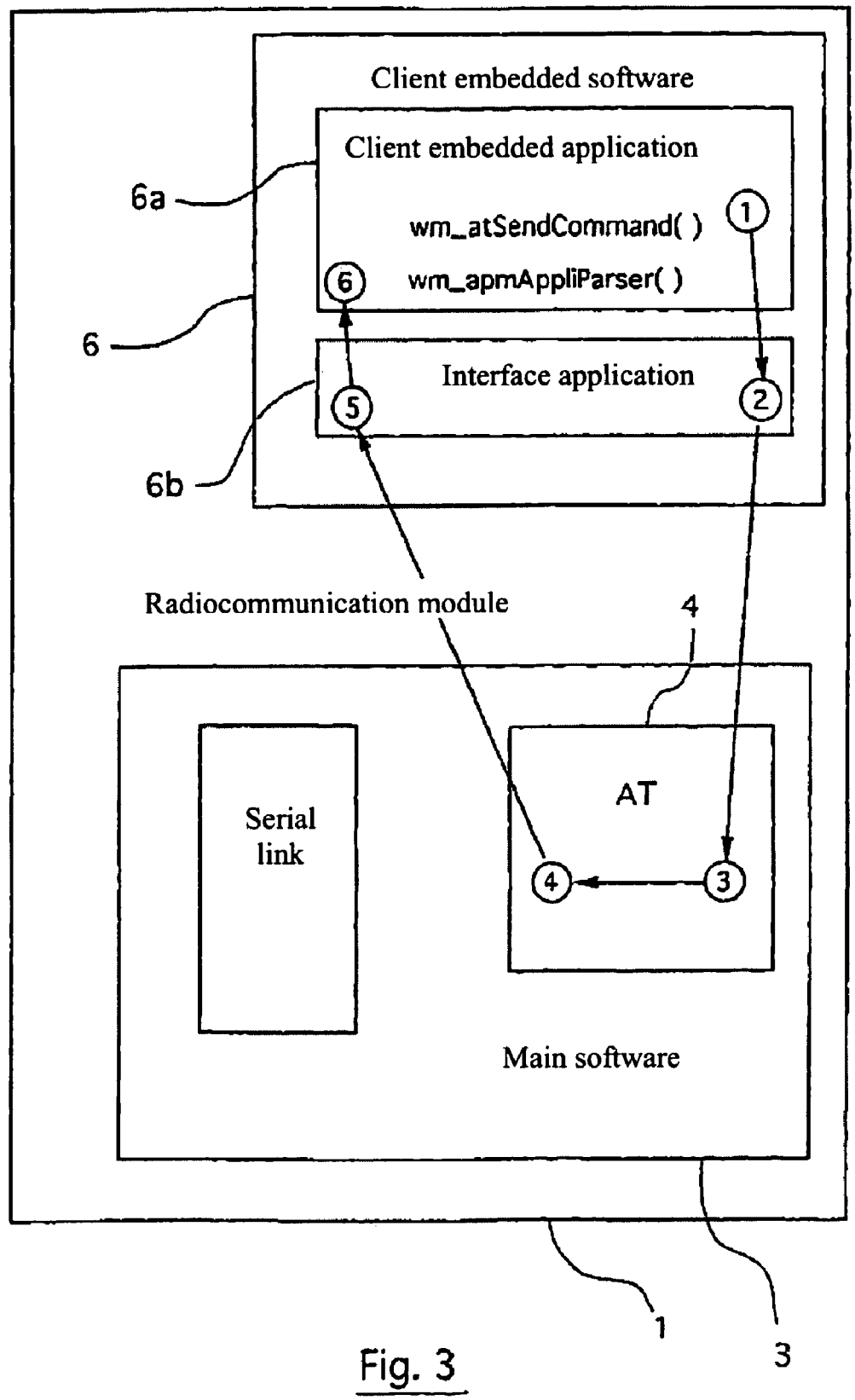
FIG. 3 illustrates the operation of a first embodiment of the radiocommunication module according to this invention, in which the client embedded software acts as a client driver software.

We will now describe a first embodiment of the invention in which the client embedded software acts as a client driver software, with reference to FIG. 3.

Figure 2:
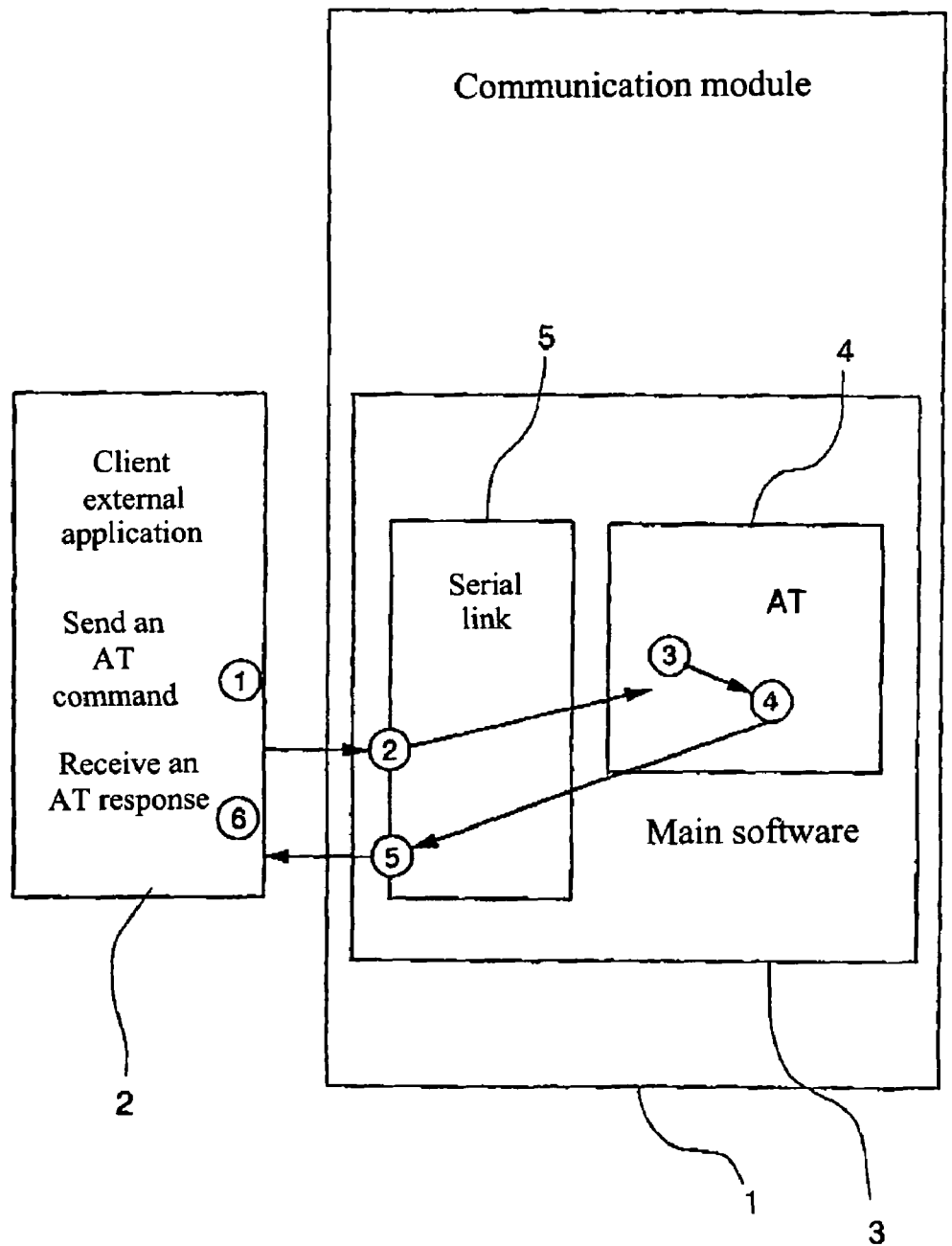
FIG. 2 shows operation of the existing technique for driving a radiocommunication module by terminal equipment.

Elements conventionally included in a radiocommunication module and described above with reference to FIG. 2 (prior art) have the same numeric references. Thus, the radiocommunication module 1 hosts and executes a main software 3 in particular comprising means 4 of executing AT commands.

Furthermore, according to the first embodiment of the invention and as presented above with reference to FIG. 1, the radiocommunication module 1 hosts and also executes a client embedded software 6 that acts as a client driver software, and in particular comprises a client embedded application 6a, and an interface application 6b.

Operation of this first embodiment of the invention may be summarized as follows:

step "1": The client embedded application 6a calls a source function (wm_atSendCommand") to send one or several AT commands to the execution means 4 (included in the main software). This source function is presented in detail in the remainder of this description;

step "2": the interface application 6b calls the appropriate execution function(s) within the execution means 4 (included in the main software 3);

step "3": the execution means 4 execute the AT command(s);

step "4": after execution, the execution means 4 send the AT response(s) to the client embedded application 6a (if the previous send command was configured to do this);

step "5": this or these responses are sent by the interface application 6b that calls the source function ("wm_apmAppliParser") for processing a message from the main software, within the client embedded application 6a. The message that contains the above mentioned response(s) is a parameter of this source processing function. This source function is presented in detail in the remainder of the description;

step "6": the source processing function processes the response within the client embedded application 6a.

We will now present a second embodiment of the invention with relation to FIGS. 4 to 7, in which the client embedded software acts as the client supervision software.

In this second embodiment, the radiocommunication module is not independent (unlike in the first embodiment), but is controlled by a terminal equipment with which it cooperates. Therefore the configuration is the same as in prior art described above with relation to FIG. 2 (the same elements are marked with the same numeric references). In other words, a client external application (client driver software) 2 sends AT commands to a main software 3, so that they can be executed by the main software 3.

According to the second embodiment of the invention, the radiocommunication module 1 also hosts and executes a client embedded software 6 acting as client supervision software and in particular comprising a client embedded application 6 and an interface application 6b. The client embedded software supervises execution (or lack of execution) of AT commands using execution means 4 included in the main software 6, transparently to the client external application 2.

The client embedded software 6 (supervision software) may decide to use the following in particular, within the radiocommunication module:

an AT command preparsing and processing mechanism for commands sent by the client external application (client driver software) 2. Three variant embodiments of this mechanism are proposed, for example, according to which the main software 3 transmits the AT commands that it receives; either to the execution means 4 only (first variant), or to the client embedded software 6 only (second variant) or to both (third variant);

an AT response preparsing and processing mechanism, resulting from the execution of AT commands by the execution means 4 (included in the main software 3). For example, three variant embodiments of this mechanisms are proposed by which AT responses generated by the main software 3 are transmitted only to the client external application 2 (first variant), or only to the client embedded software 6 (second variant), or to both.

It will be noted that the first variant of each of the two mechanisms mentioned above (for AT commands and for AT responses respectively) means that the client embedded software 6 may decide to be completely passive at some times. Therefore, they correspond to conventional operation of the radiocommunication module, as described above with relation to FIG. 2, and are not described again.

Figure 4:
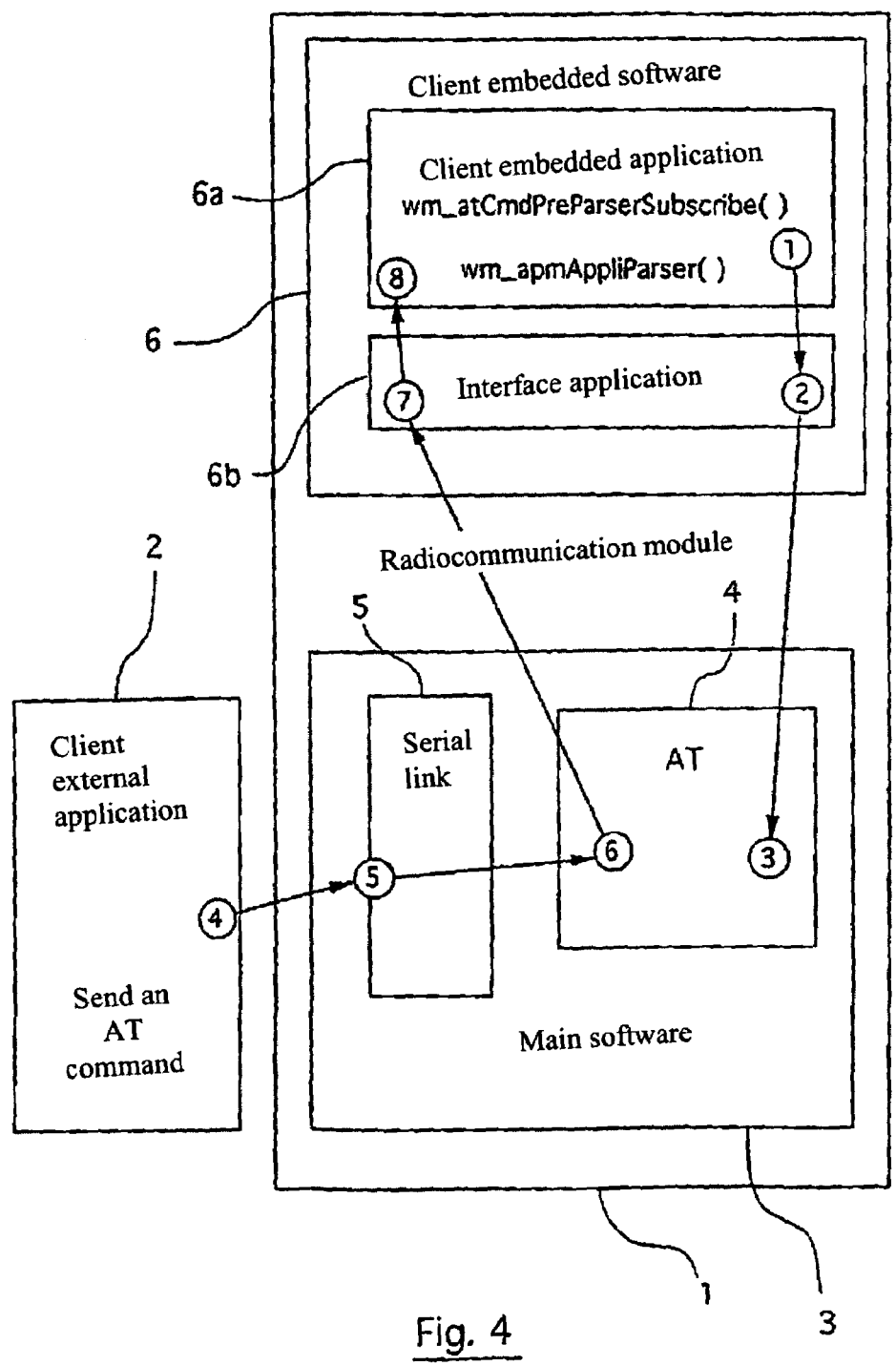
FIGS. 4 to 7 each illustrate a mechanism for operation of a second embodiment of the radiocommunication module according to this invention, in which the client embedded software acts as client supervision software, and more precisely.

We will now describe the second variant of the AT command preparsing and processing mechanism, which enables the client embedded software 6 to filter AT commands originating from the client external application 2, with reference to FIG. 4.

Operation of this second variant of the AT command preparsing and processing mechanism can be summarized in two phases done in sequence, namely:

a prior phase in which the client external application 2 selects the (second) AT command preparsing policy, according to which AT commands are forwarded only to the client embedded software 6, and, a processing phase according to the "second" selected command preparsing policy, to process AT commands sent by the client external application 2.

The preliminary phase to select the second AT command preparsing policy comprises the following steps:

step "1": the client embedded application 6a calls a source function ("wm_at_CmdPreParserSubscribe") for registration with the main software 3 to an AT command preparsing service, with a parameter for this registration function that indicates the choice of the second AT command preparsing policy. This source function is presented in detail in the remainder of this description;

step "2": the interface application 6b calls the appropriate execution function(s) in the main software 3, that are functions for making the registration to the AT command preparsing service;

step "3": the main software 3 prepares the registration requested by the client embedded application 6a, through the interface application 6b.

For simplification reasons, it is assumed in the rest of this description (and as shown in FIG. 4), that the function(s) for making the registration to the AT command preparsing service are included in the means 4 of executing AT commands, within the main software 3.

Also for simplification reasons, it is assumed in the rest of the description (and as shown in FIG. 4) that the command preparsing means (discussed below) are included within the AT command execution means 4, within the main software 3.

The AT command processing phase includes the following steps:

step "4": the client external application 2 sends an AT command to the main software 3;

step "5": the serial link 5 sends the AT command to command preparsing means, included in the execution means 4 (themselves included in the main software 3) and operating according to the second AT command preparsing policy (selected during the previous phase);

step "6": the AT command is transmitted only to the client embedded software 6, without being executed by the execution means 4;

step "7": the AT command is sent by the interface application 6b that calls the ("wm_apmAppliParser") source function for processing a message from the main software, within the client embedded application 6a, in this case configured by a message that contains the AT command and that indicates that it is the "original" AT command. This source function is described in detail in the remainder of the description;

step "8": the source processing function within the client embedded application 6a processes the AT command.

For example, this processing consists of resending the AT command to execution means 4 (using the mechanism corresponding to the first embodiment of the invention, described above in relation to FIG. 3). It may also consist of the arbitrary supply of a response by the client embedded software 6 itself, without the AT command being executed. In this case, the client embedded software 6, for example, takes account of at least one item of information about the AT command concerned (command type, nature of the parameter(s), etc.). In general, it is understood that the client embedded software 6 "filters" the AT command, regardless of the processing done.

Figure 5:
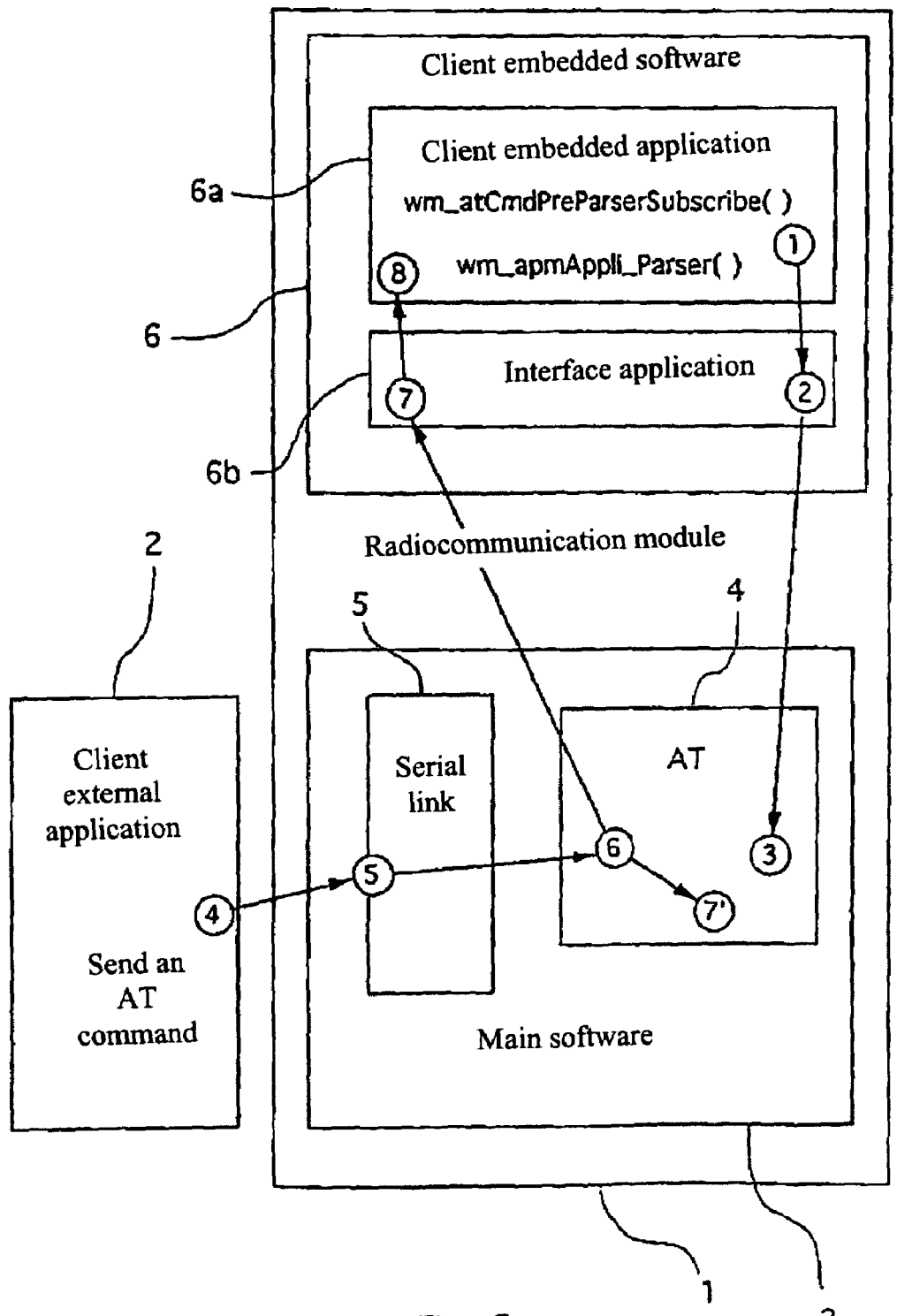

We will now describe the third variant of the AT command preparsing and processing mechanism that enables the client embedded software 6 to spy on AT commands from the client external application 2, in relation with FIG. 5.

Operation of this third variant of the AT command preparsing and processing mechanism can also be summarized as two successive phases, namely:
- a preliminary phase in which the client external application 2 selects the "third" AT command preparsing policy, according to which AT commands are sent not only to the client embedded software 6, but also to the execution means (included in the main software 3), and
- a processing phase, according to the "third" selected command preparsing policy, for processing AT commands sent by the client external application 2.

Operation of this third variant is only very slightly different from operation of the second variant, essentially in that:
- during step "1" of the preliminary phase, the client embedded application 6a selects the third (and not the second) AT command preparsing policy;
- during step "6" of the processing phase, the AT command is sent to the execution means 4 and a copy of this AT command is sent to the client embedded software 6;
- during step "8" of the processing phase, within the client embedded application 6a, the source processing function processes the copy of the AT command;
- the processing phase also comprises a step "7" within which the execution means 4 included in the main software 3 execute the AT command.

Figure 6:
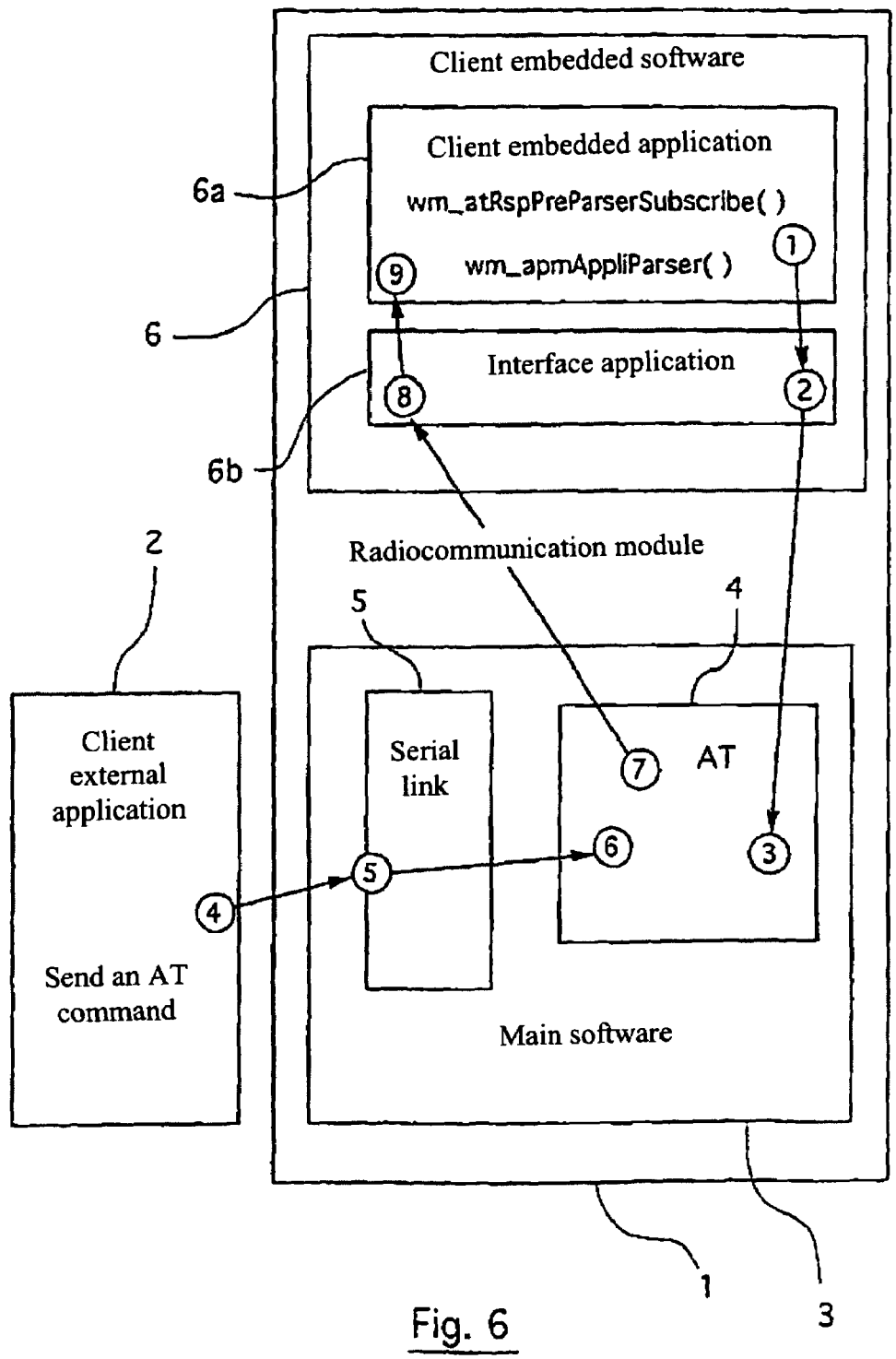

We will now describe the second variant of the AT response preparsing and processing mechanism that the client embedded software 6 uses to filter AT responses sent to the client external application 2, with reference to FIG. 6.

Operation of this second variant of the AT response preparsing and processing mechanism can be summarized in two phases done in sequence, namely:
- a preliminary phase in which the client external application 2 selects the (second) AT response preparsing policy, according to which AT responses generated by the main software 3 are sent to the client embedded software 6 only;
- a processing phase according to the "second" selected response preparsing policy, to process AT responses generated by the main software 3.

The preliminary phase to select the second AT response preparsing policy comprises the following steps:
- step "1": the client embedded application 6a calls a source function ("wm_atRspPreParserSubscribe") for registration with the main software 3 to an AT response preparsing service, with a parameter for this registration function that indicates the choice of the second AT response preparsing policy. This source function is presented in detail in the remainder of this description;
- step "2": the interface application 6b calls the appropriate execution function(s) in the main software 3, called functions for making the registration to the AT response preparsing service;
- step "3": the main software 3 prepares the registration requested by the client embedded application 6a, through the interface application 6b.

For simplification reasons only, in the remainder of the description (as shown in FIG. 6), it is assumed that the function for making a registration to the AT response preparsing service, within the main software 3, is included within the AT command execution means 4.

Also for simplification reasons only, it is assumed in the remainder of the description (and as shown in FIG. 6) that the response preparsing means (discussed below) are included in the AT command execution means 4, within the main software 3.

The AT response processing phase comprises the following steps:
- step "4": the client external application 2 sends an AT command to the main software 3;
- step "5": the serial link 5 sends the AT command to the execution means 4 (included in the main software 3);
- step "6": the execution means 4 execute the AT command and generate an AT response;
- step "7": response preparsing means, included in the execution means 4 and operating according to the second AT response preparsing policy (selected in the previous phase) send the AT response to the client embedded software 6;
- step "8": the AT response is sent by the interface application 6b that calls the source function ("wm_apmAppliParser") within the client embedded software 6a and provided to process a message from the main software, in this case configured particularly by a message that contains the AT response and that indicates that it is the "original" AT response;
- step "9": the source processing function processes the AT response, within the client embedded application 6a. In this case, this is called "filtering" of AT responses by the client embedded software.

Figure 7:
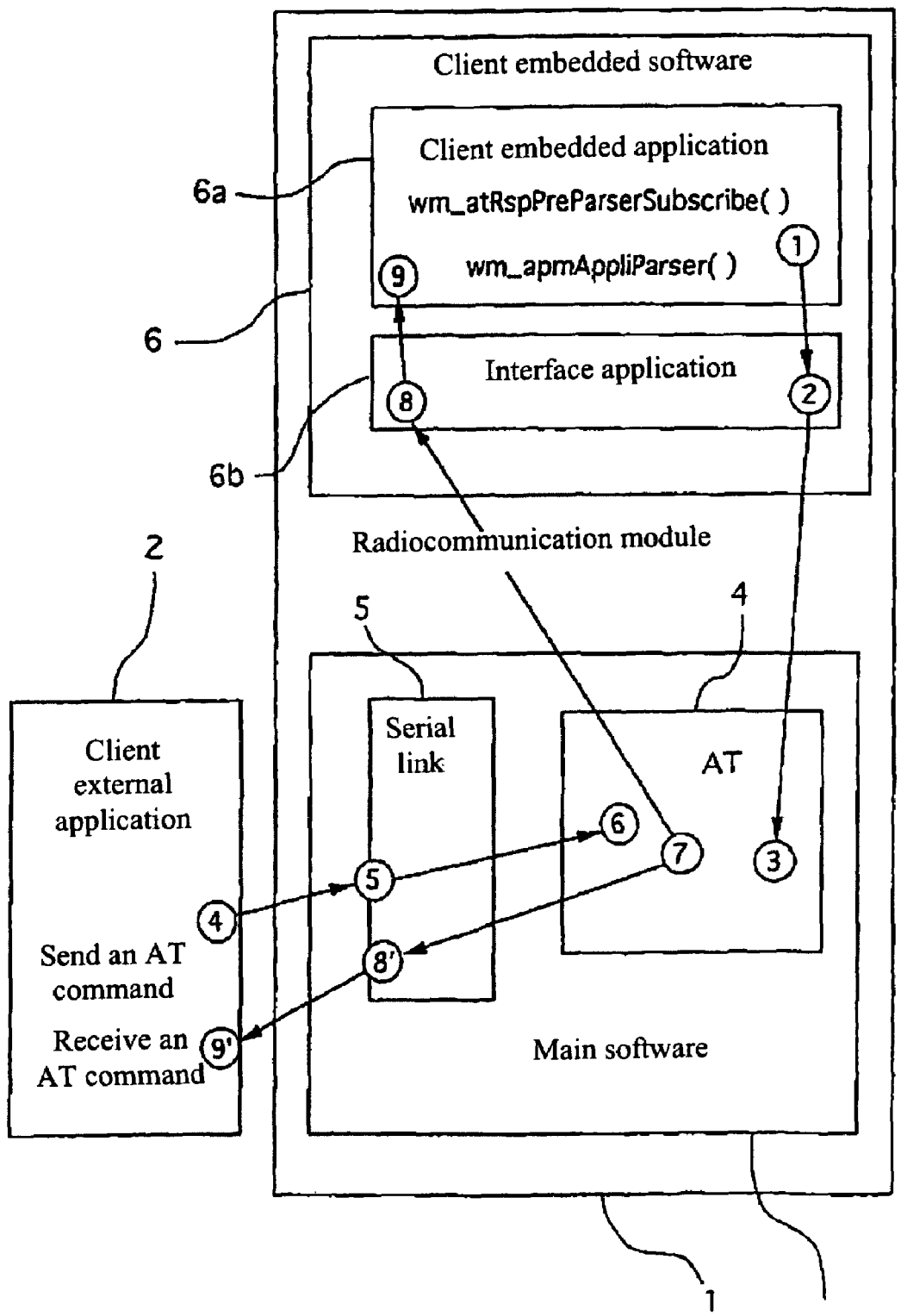

We will now describe the third variant of the AT response preparsing and processing mechanism that the client embedded software 6 uses to spy on AT responses sent to the client external application 2, with reference to FIG. 7.

Operation of this third variant of the AT response preparsing and processing mechanism can also be summarized as two successive phases, namely:
- a preliminary phase in which the client external application 2 selects the (third) AT response preparsing policy, according to which AT responses are retransmitted not only to the client embedded software 6, but also to the client external application 2, and
- a processing phase according to the (third) selected response preparsing policy, for processing AT responses generated by the main software 3.

The main differences between the operation of this third variant and operation of the second variant are that:
- during step "1" of the preliminary phase, the client embedded application 6a selects the third (and not the second) AT response preparsing policy;
- during step "7" of the processing phase, the AT response is sent to the client external application 2 and a copy of this AT response is sent to the client embedded software 6;
- during step "9" in the processing phase, the source processing function processes the copy of the AT response, within the client embedded application 6a;

the processing phase also includes a step "8" during which the response is sent through the serial link 5, and a step "9" during which the client external application 2 receives and processes the response.

Appendix 1 contains a detailed presentation of some of the source functions on which the client embedded application is based.

For example, Appendix 2 contains an example application of an embedded application written in the C language, the objective of which is to send an ATI3 command three seconds after each initialisation and to write objects in Flash memory.

Optionally, for the purposes of this invention, it is also possible to use at least one of the following additional AT commands in addition to standard AT commands:

command to load a client software (AT+WDWL) to enable the client external software to load a new client software into the radiocommunication module;

deactivate command (AT+WOPEN) enabling the client external software to deactivate the client embedded software.

APPENDIX 1

Detailed Presentation of Some Source Functions on Which the Client Embedded Application is Based A1) "wm_apmAppliParser"

Function for processing a message from the main software. The message forming parameter of the processing function in particular contains an AT command or a response to an AT command.

Exact name:
bool wm_apmAppliParser(wm_apmMsg_t*Message);

Parameters:
Message

The message structure is different for each type of received message:

```
Typedef struct
{
    S16 MsgTyp;
    /* "MsgTyp" is a received message type to determine
    the associated structure of the message body */
    wm_apmBody_t   Body;   /*   "Body" is a specific
    message body */
} wm_apmMsg_t;
Values of "MsgTyp":
WM_AT_SEND_RSP
```

The message contains a response to an AT command previously sent to the main software by the client embedded software
WM_AT_UNSOLICITED The message contains an unsolicited AT command
WM_AT_CMD_PRE_PARSER The message contains an AT command sent by a client external software through the main software.
WM_AT_RSP_PRE_PARSER The message contains an AT response resulting from the main software executing an AT command originating from an external application.
WM_OS_TIMER The message is sent on expiration of a timeout The structure of the body is:

```
typedef union
{
    /* The following includes all specific structures
    associated with "MsgTyp" */ message types
    /* WM_AT_SEND_RSP */
    wm_atResponse_t                    ATResponse;
    /* WM_AT_UNSOLICITED      */
    wm_atUnsolicited_t                 ATUnsolicited;
    /* WM_AT_CMD_PRE_PARSER      */
    wm_atCmdPreParser_t                ATCmdPreParser;
    ;/* WM_AT_RSP_PRE_PARSER      */
    wm_atRspPreParser_t                ATRspPreParser
    /* WM_OS_TIMER      */
    wm_osTimer_t      OSTimer;
} wm_apmBody_t;
Substructures of the body are as follows:
Body for WM_AT_SEND_RSP:
    typedef struct {
        wm_atSendRspType_e      Type;
        u16                     StrLength; /* Length of
                                strData */
        char                    StrData[1]; /* AT response
        */
    } wm_atResponse_t;
    typedef enum {
        WM_AT_SEND_RSP_TO_EMBEDDED,
        WM_AT_SEND_RSP_TO_EXTERNAL,
        WM_AT_SEND_RSP_BROADCAST
    } wm_atSendRspType_e;
    (see details of the "wm_atSendCommand" function for
    the description of "wm_atSendRspType_e description
    "),
Body for WM_AT_UNSOLICITED:
    typedef struct {
        wm_atUnsolicited_e      Type;
        u16                     StrLength;
        char                    StrData[1];
    } wm_atUnsolicited_t;
    typedef enum {
        WM_AT_UNSOLICITED TO_EXTERNAL,
        WM_AT_UNSOLICITED_TO_EMBEDDED,
        WM_AT_UNSOLICITED_BROADCAST
    } wm_atUnsolicited_e;
    (see details of the "wm_atUnsolicitedSubscription"
    function for the description of "wm_atUnsolicited_e
    ").
Body for WM_AT_CMD_PRE_PARSER:
    typedef struct {
        wm_atCmdPreSubscribe_e      Type;
        u16                         StrLength;
        char                        StrData[1]
    } wm_atCmdPreParser_t;
    typedef enum {
        WM_AT_CMD_PRE_WAVECOM_TREATMENT, /*
        Default value
        */
        WM_AT_CMD_PRE_EMBEDDED_TREATMENT,
        WM_AT_CMD_PRE_BROADCAST
    } wm_atCmdPreSubscribe_e;
    (see details of the "wm_atRspPreParserSubscribe"
    function for the description of
    "wm_atCmdPreSubscribe_e").
Body for WM_AT _RSP_PRE_PARSER:
    typedef struct {
        wm_atRspPreSubscribe_e      Type;
        u16                         StrLength;
        char                        StrData[1];
    } wm_atRspPreParser_t;
    typedef enum {
        WM_AT_RSP_PRE_WAVECOM_TREATMENT /*
        Default value
        */
        WM_AT_RSP_PRE_EMBEDDED_TREATMENT,
        WM_AT_RSP_PRE_BROADCAST
    } wm_atRspPreSubscribe_e;
```

```
(see details of the "wm_atRspPreParserSubscribe"
  function for the description of
  "wm_atRspPreSubscribe_e").
Body for WM_OS_TIMER:
  typedef struct {
    u8              Ident; /* Timeout identifier
    */
  } wm_osTimer_t;
```

(see details of the "wm_osStartTimer" function for a description of "Ident").

Returned parameters

The return parameter indicates if the message is processed (TRUE) or not (FALSE).

A2) "wm_atSendCommand"

Function for sending at least one AT command to the main software, in which one parameter indicates the destination software (namely the client embedded software and/or the client external software) of the response resulting from execution of this AT command.

Exact name:
Void wm_atSendCommand (u16 AtStringSize
    wm_atSendRspType_e Responsetype,
    char *AtString,);

Parameters:
AtString

This parameter may be any type of string of AT command using ASCII characters. Several strings may be sent at the same time.
AtStringSize Size of the previous parameter: AtString.
ResponseType Response type

```
Typedef enum    {
    WM_AT_SEND_RSP_TO_EMBEDDED,   /* Default value */
    WM_AT_SEND_RSP_TO_EXTERNAL,
    WM_AT_SEND_RSP_BROADCAST
} wm_atSendRspType_e;
```

WM_AT_SEND_RSP_TO_EMBEDDED
  All responses are redirected to the client embedded application. This is the default mode.
WM_AT_SEND_RSP_TO_EXTERNAL
  All responses are redirected to the client external application (PC).
WM_AT_SEND_RSP_BROADCAST
  All responses are redirected (broadcast) to the client embedded application and the client external application (PC).

A3) "wm_AtUnsolicitedSubscription"

Registration function with the main software to a service for reception of unsolicited AT commands, in which one parameter indicates the destination software (namely the client embedded software and/or the client external software), to which each of the unsolicited AT commands must be broadcast.

Exact name:
Void wm_atUnsolicitedSubscription(wm_atUnsolicited_e
    Unsolicited);

Parameters:
Unsolicited

This parameter describes actions carried out when an unsolicited AT command arrives.

```
Typedef enum
    WM_AT_UNSOLICITED_TO_EXTERNAL,   /* Default value
    */
    WM_AT_UNSOLICITED_TO_EMBEDDED,
    WM_AT_UNSOLICITED_BROADCAST,
} wm_atUnsolicited_e;
```

WM_AT_UNSOLICITED_TO_EXTERNAL
  All unsolicited commands will be broadcast to the client external application (PC) (default mode).
WM_AT_UNSOLICITED_TO_EMBEDDED
  All unsolicited commands will be broadcast to the client embedded application.
WM_AT_UNSOLICITED_BROADCAST
  All unsolicited commands will be broadcast to the client external application (PC) and the client embedded application.

A4) "wm_atCmdPreParserSubscribe"

Registration function with the main software to an AT command preparsing service, in which a parameter indicates the destination application(s) (namely the main software and/or the client embedded software) to which each AT command originating from an external application must be directed.

Exact name:
Void wm_atCmdPreParserSubscribe (wm_atCmdPreSubscribe_e SubscribeType);

Parameters
SubscribeType

This parameter describes the action carried out when an AT command arrives

```
Typedef enum
    WM_AT_CMD_PRE_WAVECOM_TREATMENT,   /* Default
    value
    */
    WM_AT_CMD_PRE_EMBEDDED_TREATMENT,
    WM_AT_CMD_PRE_BROADCAST,
} wm_atCmdPreSubscribe_e;
```

WM_AT_CMD_PRE_WAVECOM_TREATMENT
  The client embedded application does not want to filter (or spy) commands sent by the client external application (default mode).
WM_AT_CMD_PRE_EMBEDDED_TREATMENT
  The client embedded application wants to filter commands sent by the client external application.
WM_AT_CMD_PRE_BROADCAST
  The client embedded application wants to spy on commands sent by the client external application.

A5) "wm_atRspPreParserSubscribe"

Registration function with the main software to an AT response preparsing service, in which a parameter indicates the destination software (namely the client external software and/or the client embedded software) to which each AT command originating from an external application must be directed.

Exact name:
Void wm_atRspPreParserSubscribe (wm_atRspPreSubscribe_e SubscribeType);

Parameters
SubscribeType

This parameter describes the action carried out when an AT command arrives

```
Typedef enum
  WM_AT_RSP_PRE_WAVECOM_TREATMENT,  /* Default
value
*/
  WM_AT_RSP_PRE_EMBEDDED_TREATMENT,
  WM_AT_RSP_PRE_BROADCAST,
} wm_atRspPreSubscribe_e;
```

WM_AT_RSP_PRE_WAVECOM_TREATMENT
The client embedded application does not want to filter (or spy) responses sent to the client external application (default mode).
WM_AT_RSP_PRE_EMBEDDED_TREATMENT
The client embedded application wants to filter responses sent to the client external application.
WM_AT_RSP_PRE_BROADCAST
The client embedded application wants to spy on responses sent to the client external application.

A6) "wm_atSendRspExternalApp"

Function to send at least one response to the client external software, through the main software. This function can only be used if a prior registration has been made to the response preparsing service, in particular including redirection of a copy of responses to the client embedded software.

Exact name:
Void wm_atSendRspExternalApp (u16 AtStringSize, Char *AtString,);

Parameters:
AtString

May be any type of AT response string, in ASCII characters.
AtStringSize

Size of the previous parameter: AtString

A7) "DataFlowService"

Function to send and/or receive data by the client embedded software, through the main software, after a data communication has been set up.

A8) "wm_osStartTimer"

Function to start a timeout, a parameter of the said starting function indicating which timeout is to be started.

A9) "wm_osStopTimer"

Function to stop a timeout, a parameter of the said stop function indicating which timeout is to be stopped.

APPENDIX 2

EXAMPLE CLIENT EMBEDDED APPLICATION

```
/************************************************************************/
/* File : Appli.c                                                        */
/*---------------------------------------------------------------------- */
/* Object :  Customer application                                        */
/*           This program waits 3 seconds, send a ATI3 command to        */
/*           software version. It starts a cyclic timer of 3 seconds     */
/*           and writes an object in Fash with a value 0.                */
/*           Every 3 seconds, it reads object value, display it,         */
/*           increments and rewrites it in Flash.                        */
/*                                                                       */
/* contents :  Customer main procedures                                  */
/*                                                                       */
/* Change :                                                              */
/*---------------------------------------------------------------------- */
/* Date          Author    Modification                                  */
/*---------------------------------------------------------------------- */
/* 26/12/00      FCA       Creation                                      */
/************************************************************************/
#include "wm_types.h"
#include "wm_apm.h"
#include "utils.h"
#define TIMER_INIT     01
#define TIMER_CYCLIC 02
#define OBJECT_ID      0x1
char wm_apmCustomStack[1024];
const u16 wm_apmCustomStackSize = sizeof(wm_apmCustomStack);
/************************************************************************/
/* Function :  wm_apmAppliInit                                           */
/*---------------------------------------------------------------------- */
/* Objet :   Customer application initialisation                         */
/*                                                                       */
/* Return :                                                              */
/*                                                                       */
/*---------------------------------------------------------------------- */
/* Variable Name   IN   OUT   GLB   Utilisation                          */
/*---------------------------------------------------------------------- */
/* InitType                          Application start mode reason       */
```

APPENDIX 2-continued

EXAMPLE CLIENT EMBEDDED APPLICATION

```
/*************************************************************************/
void wm_apmAppliInit (wm_apmInitType_e InitType)
{
    // Trace : Level 10
    wm_osDebugtrace(10, "Init : Start timer" );
    // Start a timer for 3 seconds
    wm_osStartTimer (TIMER_INIT,FALSE, 30);
}
/*************************************************************************/
/* Function :   wm_apmAppliParser                                          */
/*-----------------------------------------------------------------------*/
/* Objet :      Customer task body                                         */
/*                                                                        */
/* Return :                                                                */
/*                                                                        */
/*-----------------------------------------------------------------------*/
/* Variable Name    IN   OUT   GLB   Utilisation                           */
/*-----------------------------------------------------------------------*/
/* pMessage                           Message sent by real time kernel     */
/*************************************************************************/
bool wm_apmAppliParser (wm_apmMsg_t * pMessage)
{
    char strCommand [] = "ATI3\r"; // don't forget '\r' at the end
    u16 u16DataLen;
    bool bRat;
    char strTraceMsg[50];
    char strData;
    switch (pMessage->MsgTyp)
    {
        case WM_OS_TIMER :
            switch (pMessage->Body.OSTimer:Ident)
            {
                case TIMER_INIT: // Timer armed in wm_apmAppliInit
                    wm_osDebugTrace(10, 'TIMER_INIT' );
                    // Result will be visible in the AT terminal window
                    wm_atSendCommand(wm_strlan(strCommand)+1,
                            WM_AT_SEND_RSP_TO_EXTERNAL, strCommand);
                    // Write object for the first time
                    strData = 0x30;
                    bRat = wm_osWriteFlashData(OBJECT_ID, sizeof(char),
                            &strData );
                    if (bRat)
                        wm_osStartTimer (TIMER_CYCLIC,TRUE, 30);
                    else
                        wm_osDebugTrace(10, "wm_osWriteFlashData failed" );
                    break:
                case TIMER_CYCLIC:
                    wm_osDebugTrace(10, "TIMER_CYCLIC" );
                    // Read object, increment value, rewrite object
                    u16DataLen = wm_osGetLenFlashData(OBJECT_ID);
                    u16DataLen = wm_osReadFlashData(OBJECT_ID, u16DataLen,
                            &strData ):
                    if (u16DataLen)
                    {
                        // Print object after read
                        wm_strcpy(strTraceMsg, "Value :");
                        strTraceMsg(wm_strlen(strTraceMsg)) = strData;
                        strTraceMsg(wm_strlen(strTraceMsg)+1 = '\0';
                        wm_osDebugTrace(10, strTraceMsg );
                        //increment it
                        strData--;
                        if (strData == 0x3A) strData = 0x30;
                        bRat = wm_osWriteFlashData(OBJECT_ID, sizeof(char),
                                &strData );
                        if (!bRet)
                            wm_osDebugTrace(10, "wm_osWriteFlashData failed" );
                    }
                    else
                        wm_osDebugTrace(10, "Read 0 byte" );
                    break;
                default;
                    break;
```

APPENDIX 2-continued

EXAMPLE CLIENT EMBEDDED APPLICATION

```
        }
            default;
                break;
        }
    return TRUE;
}
```

The invention claimed is:

1. Radiocommunication device hosting and executing a main software application that in particular performs radiocommunication functions, the said main software application comprising execution means for executing driver commands sent to the main software application by at least one client driver software application and belonging to a predetermined set of driver commands, wherein the said radiocommunication device also hosts and executes at least one client software application, called client embedded software, and wherein the client embedded software application and the main software application comprise enabling means for enabling the client embedded software application to perform at least one of the following two roles:

a role of a client driver software application sending driver commands to the main software application, and receiving responses from the main software application resulting from the execution of some of the driver commands; and a role of a client supervision software application, managing execution of driver commands sent by a client driver software application, called a client external software application, hosted on and executed by terminal equipment cooperating with the radiocommunication device.

2. Radiocommunication device according to claim 1, wherein the following features are provided to enable the client embedded software application to act as client driver software application:

the client embedded software application comprises sending means for sending driver commands to the execution means included in the main software application;

the main software application comprises sending means for sending responses resulting from the execution of some driver commands by the execution means included in the main software application, to the client embedded software application; and the client embedded software application comprises processing means for processing responses sent to it by the main software application.

3. Radiocommunication device as claimed in claim 1, wherein the following features are provided to enable the client embedded software application to act as client supervision software application:

the main software application comprises preparsing means for preparsing commands as a function of a determined preparsing policy, so as to transmit driver commands from the client external software application to the client embedded software application and/or to the execution means contained in the main software application; and the client embedded software application includes processing means for processing driver commands switched to it by the said preparsing means.

4. Radiocommunication device according to claim 3, wherein the client embedded software application comprises selecting means for selecting a command preparsing policy applied by the said preparsing means, among a set of preparsing policies including:

driver commands originating from the client external software application are sent only to the execution means within the main software application;

driver commands originating from the client external software application are sent only to the client embedded software application; and driver commands originating from the client external software application are sent to the execution means within the main software application and to the client embedded software application.

5. Radiocommunication device as claimed in claim 3, wherein the said command processing means comprise at least one decision for each command, belonging to the group including:

send the driver command to the execution means included in the main software application, the client embedded software application comprising sending means for sending driver commands to the execution means for this purpose; and supply or do not supply a response, only as a function of at least one item of information about the command, without executing the command, the client embedded software application comprising sending means for sending the response to the client external software application for this purpose through the main software application.

6. Radiocommunication device as claimed in claim 1, where in order to enable the client embedded software application to act as client supervision software application:

the main software application comprises preparsing means for preparsing responses as a function of a determined response preparsing policy, so as to transmit responses resulting from the execution of some driver commands by the execution means included in the main software application, to the client embedded software application and/or to the client external software application; and the client embedded software application comprises processing means for processing responses switched to it by the said response preparsing means.

7. Radiocommunication device according to claim 6, wherein the client embedded software application comprises selecting means for selecting the response preparsing policy applied by the said response preparsing means, among a set of response preparsing policies including:

responses originating from the execution means are transmitted only to the client external software application;

responses originating from the execution means are transmitted only to the client embedded software application; and responses originating from the execution means are transmitted to the client embedded software application and to the client external software application.

8. Radiocommunication device as claimed in claim 6, wherein it is included within a device belonging to the following group:

radiocommunication terminals;

devices other than radiocommunication terminals necessitating a wireless communication feature; and modems.

9. Radiocommunication device as claimed in claim 1, wherein the said main software application comprises at least one main application particularly based on a set of execution functions, each enabling the execution of at least one of the said driver commands, in that the said client embedded software application comprises a client application particularly based on a set of source functions, each enabling sending or receiving driver commands or responses to driver commands, to or from the main application, and in that the main software application and/or the said client embedded software application comprise an application interface used to interface the said source functions with the said execution functions.

10. Radiocommunication device as claimed in claim 1, wherein the said client embedded software application comprises a client application, particularly based on a set of source functions, each enabling sending or receiving driver commands or responses to driver commands, to or from the main application, and in that the said set of source functions particularly comprises a function for processing a message originating from the main software application, the said message being a parameter of the said processing function.

11. Radiocommunication device according to claim 10, wherein the structure of the said message forming a parameter of the said processing function comprises:
   a first field containing information related to a type of the said message;
   a second field containing a specific body of the said message.

12. Radiocommunication device according to claim 11, wherein the said message type belongs to the group comprising:
   message containing a response to a driver command previously sent to the main software application by the client embedded software application;
   message containing an unsolicited driver command;
   message containing a driver command sent by a client external software application through the main software application;
   message containing a response resulting from execution of a driver command by the main software application; and
   message sent on expiration of a timeout.

13. Radiocommunication device as claimed in claim 10, wherein the said set of source functions also comprises at least a source function belonging to the following group:
   a sending function for sending at least one driver command to the main software application, a first parameter of the said sending function being the said at least one driver command, a second parameter of the said sending function indicating a destination software application to which the response resulting from execution of the said driver command is sent, namely the client embedded software application, and/or the client external software application;
   a registration function with the main software application to a service for reception of unsolicited driver commands, one parameter of the said registration function indicating the destination software application to which each of the unsolicited driver commands is to be redirected, namely the client embedded software application, and/or the client external software application;
   a registration function with the main software application to a driver command preparsing service, in which a parameter of the said registration function indicates the destination application(s), namely the main software application and/or the client embedded software application to which each driver command originating from the client external software application must be directed;
   a registration function with the main software application to a response preparsing service, in which a parameter of the said registration function indicates the destination application(s), namely the client external application and/or the client embedded software application to which each response resulting from the execution of a driver command by the main software application, must be directed; and
   a function for sending at least one response to the client external software application, through the main software application, a parameter of the said sending function being the said at least one response.

14. Radiocommunication device as claimed in claim 1, wherein the client embedded software application and the main software application each use a distinct part of a RAM, and an attempt by one of the two software application programs to access part of the RAM reserved for the other software application will stop operation.

15. Radiocommunication device as claimed in claim 1, wherein the said set of driver commands is a set of standard AT commands.

16. Radiocommunication device according to claim 15, wherein the said set of driver commands comprises an additional AT command for loading a client software application, enabling the client external software application to load a new client software application into the radiocommunication device, in addition to standard AT commands.

17. Radiocommunication device as claimed in claim 15, wherein the said set of driver commands comprises an additional AT command called a deactivate command enabling the client external software application to deactivate the client embedded software application, in addition to standard AT commands.

18. Process for implementing a client software application for driving a radiocommunication module, the process comprising:
   hosting and executing a main software application on the radiocommunication module, wherein the main software application performs radiocommunication functions, wherein the said main software application executes driver commands sent to the main software application by the said client driver software application and belonging to a predetermined set of driver commands;
   hosting and executing at least one client software application, called the client embedded software application, on the radiocommunication module, wherein the client embedded software application and the main software application dialogue with each other such that the client embedded software application performs at least one role of a group of roles comprising:
      the role of the said client driver software application sending driver commands to the main software application, and receiving responses from the main software application resulting from the execution of some of the driver commands; and
      the role of a client supervision software application, managing execution of driver commands sent by the said client driver software application, the said client driver software application called the client external software application being hosted on and executed by terminal equipment cooperating with the radiocommunication module.

* * * * *